United States Patent [19]
Kato et al.

[11] 4,427,216
[45] Jan. 24, 1984

[54] SEAT BELT TENSIONING DEVICE

[75] Inventors: Masahiko Kato, Okazaki; Tetsuro Kikuchi, Nukata, both of Japan

[73] Assignee: Nippon Soken, Inc., Nishio, Japan

[21] Appl. No.: 292,535

[22] Filed: Aug. 13, 1981

[30] Foreign Application Priority Data

Nov. 5, 1980 [JP] Japan .......................... 55-158338[U]

[51] Int. Cl.$^3$ ............................................ B60R 21/10
[52] U.S. Cl. ............................ 280/806; 242/107.4 A; 297/480
[58] Field of Search ................ 280/805, 806; 297/480; 188/1 C; 60/632, 635; 242/107.4 A

[56] References Cited
U.S. PATENT DOCUMENTS 3,917,031 11/1975 Doin et al. ........................... 280/806
4,328,976 5/1982 Tsuge et al. ........................ 280/806

Primary Examiner—Richard A. Bertsch
Attorney, Agent, or Firm—Cushman, Darby & Cushman

[57] ABSTRACT

A seat belt tensioning device comprises a cylinder, a piston which is slidably inserted within the cylinder, a rod which connects the piston and the seat belt, a piston pushing means which is provided within the cylinder for applying driving force to the piston, a trigger means which comprises a plurality of rings and balls interposed between opposed rings and which is provided in the cylinder for usually locking the rod into the cylinder overcoming the driving force of the piston pushing means and releasing the rod from the cylinder to allow the movement of the piston only at an urgent time, and a driving means for driving the trigger means to release the rod from the cylinder at an urgent time.

11 Claims, 7 Drawing Figures

SEAT BELT TENSIONING DEVICE

BACKGROUND OF THE INVENTION

The present invention relates to a piston-cylinder type seat belt tensioning device.

In one example of the conventional piston-cylinder type seat belt tensioning devices, a piston connected to a seat belt through a rod is inserted within a cylinder and at an urgent time such as upon an impact of a vehicle, the piston is travelled by pushing force of spring means or the like to pull the seat belt so that a passenger is restrained on his seat.

The seat belt tensioning device of this type comprises a trigger means which usually locks the piston in the cylinder directly or indirectly overcoming the pushing force of the spring means and releases the locking condition only at an urgent time.

One example of such a trigger means as described above has a lock pin for locking the piston in the cylinder, and various kinds of actuator for taking off the lock pin at an urgent time.

However, when the trigger means provided with the lock pin is used, large force is required for releasing the piston from the cylinder so that the actuater becomes complex and large.

Accordingly, one object of the present invention is to provide a seat belt tensioning device provided with a trigger means capable of releasing the locking condition of the piston by small releasing force immediately at an urgent time.

DESCRIPTION OF THE DRAWINGS

Other objects and advantages of the present invention will become apparent from the following description of embodiments with reference to the accompanying drawings wherein:

FIG. 1 is a longitudinal sectional view of the seat belt tensioning device before operation;

FIG. 2 is a longitudinal sectional view of the seat belt tensioning device under operation;

FIG. 3 is an exploded perspective view of the trigger means of the present invention;

FIG. 4 and FIG. 5 are cross sectional views of the trigger means of the present invention which are assembled into the seat belt tensioning device respectively;

FIG. 4 shows the trigger means before operation;

FIG. 5 shows the trigger means under operation;

FIG. 6 is a longitudinal sectional view of the seat belt tensioning device before operation; and FIG. 7 is a longitudinal sectional view of the seat belt tensioning device under operation.

SUMMARY OF THE INVENTION

Figure 1:
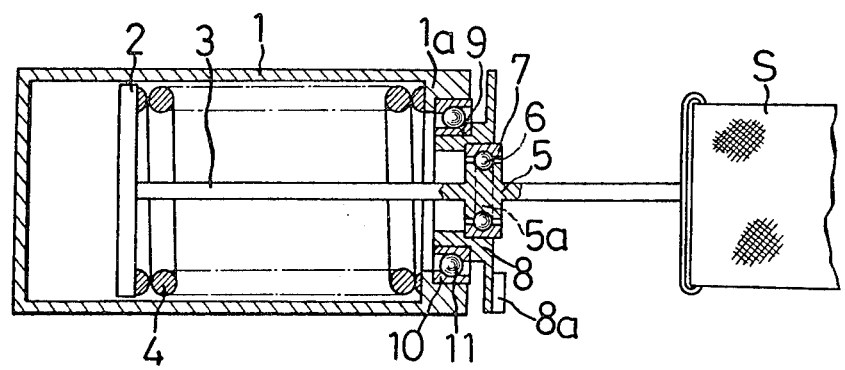
FIG. 1 to FIG. 5 show a first embodiment of the seat belt tensioning device of the present invention.
Figure 2:
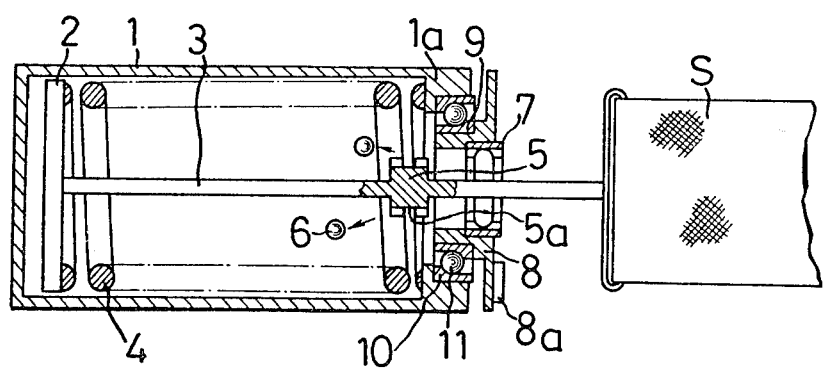

The present invention is characterized in that an annular ball bearing is used as the trigger means of the seat belt tensioning device.

Namely, between the rod and the inner wall of the cylinder, there is disposed an annular ball bearing which is composed of a plurality of relatively rotatable rings and a plurality of balls which are interposed between the adjacent rings.

The innermost ring of the annular ball bearing is integrally connected to the rod and the outermost ring thereof is integrally connected to the cylinder.

Each ring is provided with a means for blocking the axial movement thereof relative to the opposed ring. And one couple of the opposed rings is provided with a means for allowing the relative movement thereof in the axial direction at a predetermined angular position.

And one ring of the above couple is provided with a ring operating means for rotating the ring at an urgent time.

Since the trigger means of the present invention is composed of the annular ball bearinng, one ring of the trigger means can be rotated by a small operating force. And when the ring is rotated into a predetermined angular position relative to the opposed ring, the locking condition of the couple of rings is immediately released and the piston which is pushed by the pushing means travels within the cylinder together with the rod so that the seat belt is tensioned.

DETAILED DESCRIPTION OF THE INVENTION

Hereinafter, the present invention will be explained in detail in accordance with embodiments with reference to the drawings.

FIG. 1 to FIG. 5 show a first embodiment of a seat belt tensioning device of the present invention.

Within a cylinder 1, a piston 2 is slidably inserted and the piston 2 is connected to a seat belt S through a rod 3. And a coil spring 4 which elastically pushes the piston in the opposite direction to the seat belt is disposed between the piston 2 and an open end wall 1a of the cylinder 1.

In the central portion of the rod 3, an innermost ring 5 of an annular ball bearing is integrally formed.

Figure 3:
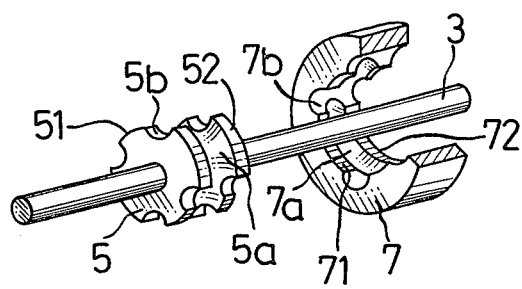

As shown in FIG. 3, in the outer peripheral surface of the innermost ring 5, a raceway grooove 5a is formed in the circumferential direction thereof, and in both shoulder walls 51 and 52 of the raceway groove 5a, four raceway grooves 5b are formed in the axial direction thereof at equal intervals respectively.

An outer ring 7 is disposed around the innermost ring 5. In the inner peripheral surface of the outer ring 7, a raceway groove 7a is formed in the circumferential direction thereof and in both shoulder walls 71 and 72 of the raceway groove 7a, four raceway grooves 7b are formed in the axial direction thereof at equal intervals respectively.

The innermost ring 5 and the outer ring 7 are coupled with each other so that the raceway grooves 5a and 7a are opposed to each other and that the axially extending raceway grooves 5b and 7b are deviated by a predetermined phase difference.

Balls 6 are accommodated within a space defined by the raceway grooves 5a and 7a so as not to be opposed to the raceway grooves 5b and 7b.

To the outer peripheral surface of the outer ring 7, a spacer ring 8 provided with a flange portion, is integrally fixed.

A weight 8a is fixed to the outside end surface of the flange portion of the spacer ring 8.

And to the outer peripheral surface of the spacer ring 8, a ring 9 provided with a raceway groove formed in the outer peripheral surface thereof in the circumferential direction, is fixed.

And an outermost ring 10 provided with a raceway groove in the inner peripheral surface in the circumferential direction thereof, is integrally fixed to the open end wall 1a of the cylinder 1 so as to be opposed to the ring 9.

The ring 9 is provided with a shoulder portion in the outside end of the outer peripheral surface thereof, and the outermost ring 10 is provided with a shoulder portion in the inside end of the inner peripheral surface thereof.

Balls 11 are placed within a space defined by the raceway grooves and the shoulder portions of the ring 9 and the outermost ring 10 so that the ring 9 and the outermost ring 10 do not relatively move in the axial direction thereof.

The seat belt tensioning device having the above described construction is installed within a room of a vehicle so that the flange portion of the spacer ring 8 extends along the forward and the backward direction of the vehicle.

Figure 4:
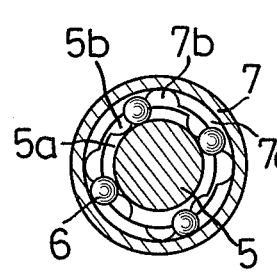

Usually, the innermost ring 5 does not move in the axial direction thereof as shown in FIG. 1 and FIG. 4. Upon the innermost ring 5, elastic pushing force of the coil spring 4 operates leftwards.

Therefore, the balls 6 are pressed by the shoulder wall 52 of the innermost ring 5 to the shoulder wall 71 of the outer ring 7 so that the outer ring 7 does not rotate relative to the innermost ring 5.

Figure 5:
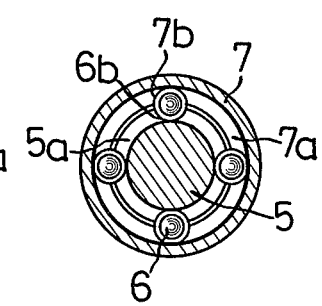

At an urgent time such as upon an impact of the vehicle, the speed of the vehicle is suddenly decreased and inertia force operates upon the weight 8a of the spacer ring 8 to rotate the spacer ring 8 and the outer ring 7 in the direction of an arrow in FIG. 4. As the outer ring 7 is rotated the positions of the axially extending raceway grooves 7b of the outer ring 7 are changed into those opposed to the axially extending raceway grooves 5b of the innermost ring 5 and the balls 6 are rotated and move to such positions as to be opposed to the raceway grooves 5b and 7b as shown in FIG. 5.

As a result, the balls 6 release the innermost ring 5 from the outer ring 7 so that the innermost ring 5 becomes movable in the axial direction thereof with respect to the outer ring 7. Consequently the rod 3 and the piston 2 fixed to the rod 3 more leftwards by the pushing force of the spring 4 in FIG. 2.

At this time, the balls 6 jump out of the annular ball bearing into the cylinder 1.

Therefore, the seat belt S is pulled by the rod 3 leftwards to restrain the passenger on his seat.

As the ring operating means, other means such as electromagnetic rotary solenoid, can be used in place of the means described above. In this case, to an impact sensor which is installed in the vehicle, a rotary solenoid is electrically connected and at an urgent time such as upon an impact of the vehicle, the electromagnetic rotary solenoid operates to rotate the outer ring 7.

Figure 6:
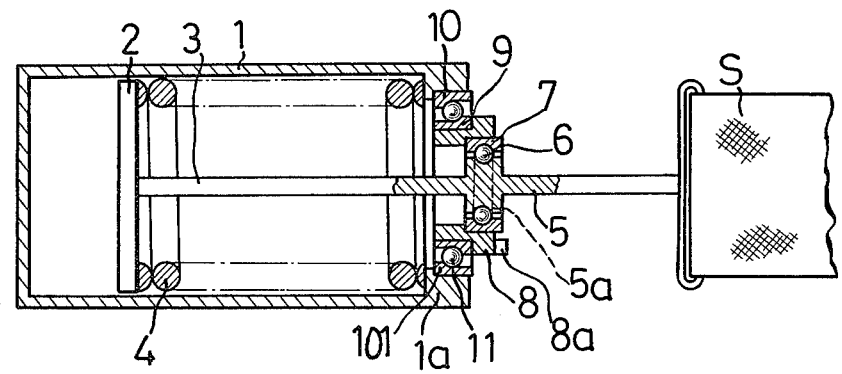
FIG. 6 and FIG. 7 show a second embodiment of the present invention.
Figure 7:
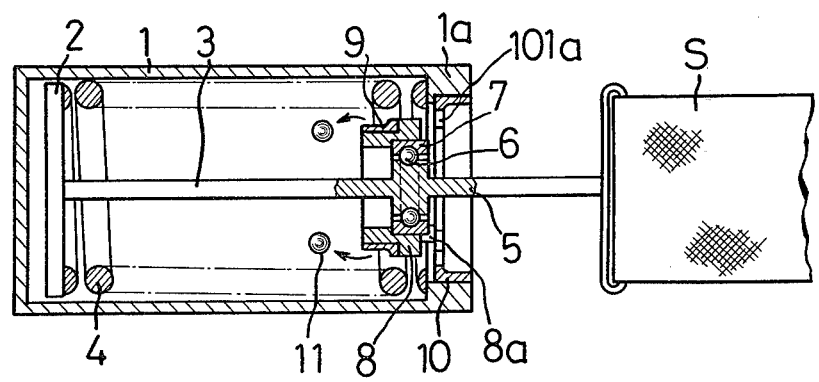

FIG. 6 and FIG. 7 show a second embodiment. According to the second embodiment, at an urgent time, the ring 9 is released from the outermost ring 10 so that the piston 2 moves to pull the seat belt S.

In a shoulder wall 101 of the outermost ring 10, four raceway grooves 101a are formed in the axial direction thereof at equal intervals.

The flange portion of the spacer ring 8 has an outer diameter smaller than the inner diameter of the outermost ring 10. And a weight 8a is fixed to the outside end surface of the flange portion of the spacer ring 8.

Other construction of the seat belt tensioning device of the second embodiment is substantially equal to that of the first embodiment.

At an urgent time such as upon an impact of the vehicle, the spacer ring 8 is rotated by inertia force operating upon the weight 8a. And the ring 9 and the balls 11 also rotate together with the spacer ring 8. And the positions of the balls 11 are changed into those opposed to the axially extending raceway grooves 101a, the spacer ring 8 becomes free from the outermost ring 10.

And by the elastic pushing force of the spring 4, the balls 11, the rings 9, 8, and 7 are pulled into the cylinder 1 together with the innermost ring 5 fixed to the rod 3.

As described above, according to the present invention, the piston can be usually locked in the cylinder through the rod in the axial direction thereof with firm by providing the annular ball bearing between the rod and the cylinder.

And at an urgent time, the locking condition of the piston to the cylinder can be released by a small ring operating force with small frictional resistance.

Therefore, the seat belt is immediately tensioned to prevent the passenger from the secondary impact.

Having now fully described the invention, it will be apparent to one of ordinary skill in the art that many changes and modifications can be made thereto without departing from the spirit or scope of the invention as set forth herein.

What is claimed is:

1. A seat belt tensioning device which is installed in a vehicle, comprises:
   a cylinder having a bottomed end and an open end;
   a piston which is slidably inserted within said cylinder so as to move in one direction therealong;
   a rod which connects said piston and a seat belt;
   a piston pushing means which is provided within said cylinder for applying driving force to said piston in said one direction;
   a trigger means which is provided in said open end of said cylinder for usually locking said rod into said cylinder overcoming said driving force of said piston pushing means and releasing said rod from said cylinder to allow the movement of said piston only at an urgent time such as upon a vehicle impact;
   said trigger means comprising an annular ball bearing which is installed between inner wall of said cylinder in said open end thereof and said rod which is inserted within said cylinder, said annular ball bearing being composed of a plurality of rings which are engaged so as to be relatively rotatable and balls interposed between opposed rings, and include an innermost ring fixed to said rod and an outermost ring fixed to said inner wall of said cylinder;
   each ring being provided with blocking means for blocking the relative movement of opposed rings in axial direction;
   one couple of opposed rings being provided with releasing means for releasing one ring of said couple from the other ring thereof at a predetermined angular position to allow said relative movement blocked by said blocking means; and
   a driving means for applying rotating force to one of said opposed rings of said couple at an urgent time such as upon an impact of said vehicle.

2. A seat belt tensioning device according to claim 1, wherein:
   said driving means is composed of a weight which is directly or indirectly fixed to said one of said opposed rings of said couple, for applying rotating force generated due to intertia force of said weight, to said one of said opposed rings of said couple when said vehicle is suddenly stopped at an urgent time such as upon a vehicle impact.

3. A seat belt tensioning device according to claim 1, wherein:
said driving means is composed of an electromagnetic solenoid electrically connected to said impact sensor which detects a vehicle impact to generate electrical signal.

4. A seat belt tensioning device according to claim 1, wherein:
said piston pushing means is composed of a coil spring, one end of which is fixed to said piston and the other end of which is fixed to said inner wall of said cylinder in said open end.

5. A seat belt tensioning device according to claim 1, wherein:
each ring is provided with one circumferentially extending raceway groove which is formed in the peripheral surface thereof so as to be opposed to that of the opposed ring for retaining balls therebetween and at least one shoulder portion composing said blocking means, which is formed along said circumferentially extending raceway groove;
said releasing means is composed of axially extending raceway grooves which are formed in said at least one shoulder portion of said couple of said opposed rings so as not to be opposed to said balls;
whereby when said axially extending raceway grooves of said one of said opposed rings of said couple, are not opposed to those of said the other opposed ring, said relative movement of said opposed rings of said couple in the axial direction is blocked by said blocking means and only at an urgent time, said driving means operates to rotate said one of said opposed rings of said couple so that said balls are opposed to said axially extending raceway grooves of said opposed rings of said couple, and said balls escape from said axially extending raceway grooves of said opposed rings of said couple to release said one ring from said other ring.

6. A seat belt tensioning device according to claim 5, wherein:
said couple of opposed rings are composed of said innermost ring which is fixed to said rod, and an outer ring which is opposed to said innermost ring through said balls and which is rotated by said driving means relative to said innermost ring at an urgent time.

7. A seat belt tensioning device according to claim 6, wherein:
each of said innermost ring and said outer ring is provided with one circumferentially extending raceway groove in the peripheral surface thereof, which is surrounded by shoulder portions in both sides thereof so as to be opposed to that of the opposed ring for retaining a plurality of balls therebetween, and a plurality of axially extending raceway grooves formed in both shoulder portions at a predetermined intervals so as to be deviated from those formed in the opposed ring by a predetermined phase difference.

8. A seat belt tensioning device according to claim 5, wherein:
said couple of opposed rings are composed of said outermost ring which is fixed to said cylinder wall and a ring which is opposed to said outermost ring through said balls and which is rotated by said driving means relative to said outermost ring at an urgent time.

9. A seat belt tensioning device according to claim 8, wherein:
each of said outermost ring and said ring opposed to said outermost ring is provided with one circumferentially extending raceway groove in the peripheral surface thereof, which is formed so as to be opposed to that of the opposed ring for retaining a plurality of balls therebetween;
said outermost ring is provided with a shoulder portion inside of said circumferentially extending raceway groove, wherein a plurality of axially extending raceway grooves are formed at predetermined intervals;
said ring is provided with a shoulder portion outside of said circumferentially extending raceway groove.

10. A seat belt tensioning device according to claim 7, further comprising:
a flange member which is fixed to said outer ring so as to extend in the radial direction;
said flange member being provided with a weight.

11. A seat belt tensioning device according to claim 9, further comprising:
a flange member which is fixed to said ring opposed to said outermost ring so as to extend in the radial direction;
said flange member being provided with a weight.

* * * * *